United States Patent [19]

Woditsch et al.

[11] 3,931,025

[45] Jan. 6, 1976

[54] MAGNETIC IRON OXIDES WITH IMPROVED ORIENTABILITY AND A PROCESS FOR THEIR PRODUCTION

[75] Inventors: Peter Woditsch; Gunter Buxbaum; Franz Hund; Volker Hahnkamm, all of Krefeld, Germany

[73] Assignee: Bayer Aktiengesellschaft, Leverkusen, Germany

[22] Filed: Aug. 29, 1974

[21] Appl. No.: 501,740

[30] Foreign Application Priority Data

Sept. 21, 1973 Germany............................ 2347486

[52] U.S. Cl. .......... 252/62.62; 252/62.56; 423/634; 106/304; 106/292; 106/288 B
[51] Int. Cl.² ....................................... C01G 49/06
[58] Field of Search .... 106/304, 292, 308 B, 288 B; 423/634; 252/62.56, 62.62

[56] References Cited

UNITED STATES PATENTS

| | | | |
|---|---|---|---|
| 3,382,174 | 5/1968 | Hand | 423/634 |
| 3,652,334 | 3/1972 | Abeck et al. | 252/62.56 |
| 3,873,462 | 3/1975 | Trandell | 252/62.56 |

*Primary Examiner*—Winston A. Douglas
*Assistant Examiner*—J. V. Howard
*Attorney, Agent, or Firm*—Burgess, Dinklage & Sprung

[57] ABSTRACT

An acicular, magnetic iron oxide pigment containing about 0.1 to 2 percent by weight of zinc and phosphate ions is produced by growing seeds and subsequently reducing and optionally reoxidizing acicular FeOOH. Said seeds were formed by precipitation from an iron (II) salt solution in the presence of about 0.1 to 4 percent by weight of zinc ions and about 0.1 to 2 percent by weight of phosphate ions based on the formed seeds.

7 Claims, No Drawings

MAGNETIC IRON OXIDES WITH IMPROVED ORIENTABILITY AND A PROCESS FOR THEIR PRODUCTION

Since the works of M. Camras (U.S. Pat. No. 2,694,656), magnetic recording supports have been produced almost exclusively having anisometric magnetic pigments. In the case of acicular magnetic pigments, it is possible to obtain orientation of the pigment during tape production under the effect of an external magnetic field, thereby obtaining an increase in magnetic flux in the tape direction. This is of considerable significance for magnetic recording. Another improvement obtained by the orientation of acicular pigments is the linearization of the remanence characteristic. Accordingly, tapes produced which have anisometric magnetic pigments are superior to those produced with isometric magnetic particles in regard to sensitivity to background noise, magnetic-transfer damping and dynamic range. The orientability of magnetic single-range particles is therefore one of the most important properties of magnetic pigments. It is determined by two measuring techniques:

a. by the ratio of saturation magnetization to remanent magnetization in a cast and, optionally, calendered tape;

b. by the orientation ratio, which is the ratio of the saturation magnetization in the tape direction to the saturation magnetization perpendicularly thereto.

Since measurement of the saturation magnetization and remanence in the tape direction is easier than determining the orientation ratio and can even be carried out on normally produced narrow width tapes the orientability, i.e. the ratio of $B_R$ to $B_S$, is hereinafter used for characterizing the magnetic properties. $B_R$ and $B_S$ are measured by the Fluxmeter method at a field intensity of 1000 Oe.

Whereas in the case of chromium dioxide, which preferentially crystallizes anisometrically in the tetragonal crystal system, the c-axis coinciding with the needle axis and with the axis of light magnetization, thus providing for an orientability of 0.90 and more, much more complicated conditions prevail in the case of magnetic iron oxide.

Due to the cubic elementary cell of the magnetic iron oxides $Fe_3O_4$ and $\gamma\text{-}Fe_2O_3$, and to the isometric particle form which this normally involves, an alternative method must be found for obtaining these pigments in anisometric form. The starting materials generally used at the present time are iron oxide hydroxides, which are readily obtainable in anisometric acicular or flake form. These anisometric pigments are converted, without any change in their external form, into anisometric $Fe_3O_4$ or $\gamma\text{-}Fe_2O_3$ by dehydration, reduction and, optionally, reoxidation. The conditions under which conversion is carried out are important, being selected in such a way that the acicular form remains intact. Patent Specifications which are concerned with improving these conversion conditions include Belgian Pat. No. 658,894, U.S. Pat. Nos. 3,194,640, 3,288,588, 3,498,748 and German Offenlegungsschriften Nos. 2,064,804; 1,803,783 and 1,592,214.

The quality of the anisometric magnetic iron oxide is largely determined by the configuration of the non-magnetic starting material, goethite or lepidocrocite. The goethite or lepidocrocite can be prepared either by the precipitation process or by the Penniman process.

In the modified precipitation process, which is generally performed in a weakly acidic pH-range, part of an initially introduced iron (II) salt solution is precipitated with a precipitant which reacts basically, in the form of iron hydroxide, carbonate or basic iron salt. Iron oxide hydroxide seeds are subsequently prepared in a pH-range of about 2 to 8, preferably about 3 to 6, by introducing air at a temperature in the range of from 20° to 80°C. The seeds formed can then be grown in known manner, into iron oxide hydroxide pigment particles of suitable size, by introducing more iron(II) salt solution, alkaline reacting precipitant and air in the pH-range from 2 to 6 at temperature of from 30 to 100°C. Alkaline earth hydroxides, alkali hydroxides or alkali carbonates are particularly suitable precipitants which react basically.

Since the iron oxide hydroxide preliminary products are relatively finely divided pigments for magnetic purposes, precipitation processes in particular are used for their production. Processes of this kind are described in detail in German Offenlegungsschriften Nos. 1,592,398; 1,592,489 and 1,958,977 and British Pat. No. 1,297,310.

The Penniman process differs from the precipitation process in the manner in which it is performed after seed production. In the Penniman process, the seeds are left to grow in the presence of scrap iron (cf. for example U.S. Pat. Nos. 1,327,061 and 1,368,748). Disregarding the variant, in which the precipitation process is carried out in alkaline medium with an over-stoichiometric addition of alkali to iron(II) salt solutions, the use of iron oxide hydroxide seeds is common to both processes. However, to a certain extent, it is also possible, in the case of alkaline precipitation processes, to speak in terms of seed formation if this is taken to mean the period of time elapsing from admixture of the iron(II) salts with the alkali to the appearance of the first $\alpha\text{-}FeOOH$ needles. The particle geometry obtained on completion of the pigment formation (seed growth) is attributable to the seeds used, which therefore play a key role in the production of $\alpha\text{-}FeOOH$ starting material for the magnetic pigments.

A variety of different methods for influencing seed formation can be found in a number of Patent Specifications. Thus, French Pat. No. 1,592,812, for example, describes an improvement in the seeds by rapid precipitation and intensive stirring with ultrasonics. German Auslegeschrift No. 1,176,111 describes seed formation in the presence of phosphate ions which leads to a compact needle structure. According to German Democratic Republic Pat. No. 74 306, seed formation is influenced by the addition of surface-active substances, more especially polyphosphates. U.S. Pat. No. 3,243,375 describes a process for the production of acicular $\gamma\text{-}Fe_2O_3$ by precipitating the common hydroxides of iron and modifying metals, such as cobalt, nickel, manganese and tin, with thiosulfate and alkali iodate. Improving the $\alpha\text{-}FeOOH$ needles produced by the alkaline process is the object of the processes described in German Offenlegungsschrift No. 2,235,383 and U.S. Pat. No. 2,558,304. The addition of zinc ions inhibits goethite formation in the production of $\gamma\text{-}FeOOH$ in accordance with German Auslegeschrift No. 1,300,861. The aforementioned processes are concerned with improving the acicular form of $\alpha$- or $\gamma\text{-}FeOOH$, with a view to obtaining needles which are as isolated as possible, which do not show any signs of branching and which have a narrow particle-size distribution.

The present invention relates to an improved acicular, magnetic iron oxide pigment optionally containing cobalt, nickel and/or manganese, characterized by a zinc ion and phosphate ion content each of about 0.1 to 2 percent by weight, preferably about 0.15 to 1.0 percent of zinc ion and about 0.15 to 1.0 percent of phosphate ion, calculated as $PO_4^{3-}$.

The invention also relates to a process for the production of an acicular, magnetic iron oxide pigment, optionally containing cobalt, nickel and/or manganese, by producing acicular $\alpha$-FeOOH by the Penniman process or by the precipitation process at a pH-range of about 2 to 8 by allowing FeOOH-seeds to grow; the seeds being obtained by precipitating part of an iron-(II)salt solution with a basically reacting precipitant in the form of iron hydroxide, carbonate or basic iron salt; followed by oxidation in the pH-range of about 2 to 8, and subsequently dehydrating, reducing and optionally reoxidizing the acicular iron oxide hydroxide formed, distinguished by the fact that seed formation is carried out in the presence of about 0.1 to 4 percent by weight of zinc ions and about 0.1 to 2 percent by weight of phosphate ions, based on the $\alpha$-FeOOH to be precipitated.

The surprising effect of simultaneously adding zinc and phosphate was discovered in the search for a method of producing acicular FeOOH particles with as uniform a particle size as possible, a high ratio of length : width and near ideal acicular form without any dendrite formation, from which outstanding magnetic iron oxides, such as $Fe_3O_4$ or $\gamma$-$Fe_2O_3$, can be obtained by known processes. This surprising effect thereby improved the magnetic properties of magnetic pigments produced in this way, for example, by improving their orientability.

The addition of from 0.1 to 4 percent by weight of $Zn^{2+}$-ions, based on the $\alpha$-FeOOH to be produced, in the simultaneous presence of from 0.1 to 2 percent by weight of phosphate ions, gives rise to the formation of acicular, dendrite-free FeOOH-seeds having a uniform particle size distribution. The seeds can be obtained by precipitating part of an iron(II)salt solution with a basically reacting precipitant, in the form of iron hydroxides, carbonates or basic iron salts, followed by oxidation in a pH-range about 2 to 8 at temperatures of about 20° to 80°C. By using the FeOOH-seeds improved by the process according to the invention for pigment formation, it is also possible to obtain FeOOH-pigments which are distinguished by an improved acicular form, irrespective of the method by which the pigment formation is carried out. The seeds according to the invention can be enlarged, for example by the process described in German Offenlegungsschrift No. 1,592,398. In this process, air is introduced into a prepared seed suspension in the presence of iron(II)salt solutions, after which the iron(III)ions formed are hydrolyzed by the gradual addition of alkali. The pigment-forming process is finished when all the $Fe^{2+}$-ions have been oxidized and all the $Fe^{3+}$-ions hydrolyzed.

In addition, metal salts of cobalt, nickel and/or manganese, more especially their sulfates or chlorides, can be added in known manner both during seed production and during pigment formation. In the Penniman process, these modifying metals may also be present in the scrap iron. The metal salts are used in such a quantity that the finished pigment contains about 1 to 10 percent by weight of these metals, preferably about 1.0 to 5 percent.

One preferred embodiment of the process according to the invention is described in the following:

0.1 to 4 percent by weight and preferably from 0.2 to 2 percent by weight of $Zn^{2+}$, based on the quantity of seed to be produced, are added to an iron(II)salt solution, for example iron(II) sulfate. The anions of the zinc salts used are primarily selected according to their compatibility with the iron salts. Sulfate, chloride and nitrate are examples of suitable anions. It is obvious to use zinc sulfate where iron sulfate is employed, while zinc chloride is naturally preferred where iron chloride is employed. Experience has shown that it is advantageous to add the zinc ions before precipitation of the basic iron hydroxide, although the zinc ions are still effective when added at a later stage.

Of the iron(II)salt initially introduced, a certain percentage, preferably about 30 to 60 percent, is precipitated by the addition of a precipitant which reacts basically, for example sodium hydroxide or sodium carbonate, in the form of iron hydroxide, carbonate or basic iron(II)salt, and is subsequently oxidized by means of air. In the process according to the invention, precipitation is carried out in the presence of zinc ions and phosphate ions. The quantity of zinc ions present in the process is about 0.1 to 4 percent, and preferably about 0.1 to 2 percent, while the quantity of phosphate ions is about 0.1 to 2 percent, preferably about 0.1 to 1 percent, all percentages being based on the quantity of $\alpha$-FeOOH to be prepared. Preferably zinc ions and phosphate ions are present in equimolecular quantities. Phosphate ions can be added before or after the basically reacting precipitant.

In one particularly advantageous modification of the process according to the invention, the phosphate ions are added to the basically reacting precipitant. Suitable phosphate-ion sources are, for example, primary, secondary or tertiary orthophosphates, pyrophosphates, metaphosphates or polyphosphates of the alkali metals or free phosphoric acid itself. The combination of $Zn^{2+}$ and $PO_4^{3-}$-ions, added in equimolecular quantities, has proved to be particularly effective. In such cases where about 0.3 to 0.8 percent by weight of $Zn^{2+}$ and about 0.25 to 0.65 percent by weight of $PO_4^{3-}$ are used, based on the completed acicular FeOOH-pigment, orientability values of at least 0.86 can be readily obtained for the magnetic pigments prepared from the FeOOH. The simultaneous presence of phosphate and zinc ions has a favorable influence upon seed formation. If $\alpha$-FeOOH has already been formed in crystalline form, this synergistic effect is no longer in evidence, nor are any advantages over the addition of phosphate alone obtained. The period during which the zinc ions and phosphate ions are active in influencing seed formation can be determined by X-ray photography, according to which these ions should be added to the basic precipitation products of the iron initially formed at the very latest when no FeOOH-reflexes show up in the X-ray diagram of the sample worked up under nitrogen. On completion of seed formation, i.e. after the initial pH-value of around 7 has fallen to 4 as a result of oxidation, for example in the case of the special process according to German Offenlegungsschrift No. 1,592,398, the improvement afforded by the process according to the invention is readily shown.

Photographs taken with an electron microscope, distinctly show that the seeds have an improved acicular form with hardly any dendrite formation. In addition, the seeds have a more uniform particle-size distribution than seeds prepared by the addition either only of phosphate ions or only of zinc ions or without any additions. This improved particle form remains intact even after the pigment-forming stage.

The iron oxide hydroxides obtained in accordance with the invention can be further processed by known processes of the kind designed to improve dimensional stability of the needles during their conversion into magnetic iron oxides. An aftertreatment to protect the needles, for example with phosphate or $SiO_2$, with hydroxides or organic substances, and conversion with organic compounds, enable the advantages of the improved acicular form of the iron oxide hydroxide to be transferred to magnetic $Fe_3O_4$ or $\gamma$-$Fe_2O_3$. Iron oxide hydroxides differing both in the ratio of length : width and in their particle size can readily be obtained by the process according to the invention.

The length : width ratio of the $\alpha$-FeOOH can be controlled through the choice of the quantity of $Zn^{2+}$ and phosphate ions (cf. Table 1), while the particle size can be controlled through the growth rate:

Table 1

| Zn % by weight | $P_2O_5$ % by weight | Length : width |
|---|---|---|
| 0.38 | 0.5 | 13.5 : 1 |
| 0.74 | 0.5 | 15.2 : 1 |
| 0.74 | 0 | 32 : 1 |
| 1.5 | 0 | 38 : 1 |

Iron oxide hydroxides with a length : width ratio of about 10 : 1 up to 50 : 1, and specific surfaces of about 10 to 40 $m^2/g$ (according to BET) have proved to be particularly suitable starting materials for subsequent conversion into magnetic iron oxides.

The quality of the magnetic iron oxides produced in accordance with Examples 1 to 4 is shown in Table 2, from which it can be seen that the improved orientability is attributable to the simultaneous presence of $Zn^{2+}$-ions and phosphate ions. The improvement in the properties only reaches a maximum with a narrowly defined Zn : $P_2O_5$ ratio (Examples 2 and 3). If additional Zn is used (Example 1), the properties are less favorable, as they are when smaller quantities of phosphate are used (Example 4), or when only one of the two additives zinc (Example 6) or phosphate (Example 5) is present.

In addition, the tapes coated with the magnetic iron oxide produced in accordance with the invention show the required low-noise property of the DIN reference tape C 264 Z. The process according to the invention is illustrated by the following Examples:

EXAMPLE 1

A solution of 34.3 g of $Na_3PO_4 \cdot 12 H_2O$ in 2.1 liters of 37% sodium hydroxide is added at 35°C to 21.9 liters of an $FeSO_4$ solution containing 160 g of $FeSO_4$ per liter and 1.7 g of $ZnSO_4$ per liter contained in a fine-steel vessel. This is followed by oxidation with air for 3 hours until the pH-value has fallen to 3.5. Thereafter, the formation of $\alpha$-FeOOH is completed with 0.6 l/h of 19% sodium hydroxide at 80°C over a period of 6 hours, during which air is introduced and the pH-value increased. This is followed by stirring for 3 hours at 95°C. The $\alpha$-FeOOH is washed free from sulfate and then dried. It is then reduced with moist hydrogen at 420°C and reoxidized with air at around 280°C.

The brown, loose powder is dispersed in a bead mill, in accordance with British Patent No. 1,080,614, by grinding 22.4 parts by weight of the magnetic oxide for 3.5 hours with 8.0 parts of PVC/PVA copolymer, 1.3 parts of oleic acid, 0.88 parts of organic phosphoric acid esters and 67 parts of butyl/ethylacetate in a ratio of 1 : 1. The lacquer is then cast onto a 23 $\mu$m thick polyester film. The magnetic layer is 12 $\mu$m thick and contains approximately 20 g/$m^2$ of magnetic pigment.

The measured properties are summarized in Table 2. The low noise $UF_3$ was measured against the DIN-reference tape blank 9.5.

Two magnetic iron oxides, one standard commercial product and the other modified solely with zinc, are quoted for comparison.

EXAMPLE 2

2.1 liters of a solution containing 780 g of NaOH and 34.3 g of $Na_3PO_4 \cdot 12 H_2O$ are added at 40°C to 21.9 liters of a solution containing 160 g of $FeSO_4$ per liter and 0.85 g of $ZnSO_4$ per liter. This is followed by oxidation with air over a period of 3.5 hours. $\alpha$-FeOOH formation is then completed by the addition of approximately 500 ml of 19% NaOH/h over a period of 7.5 hours, during which time air is also passed through. Towards the end of pigment formation, a solution of 33.3 g of $Na_4P_2O_7 \cdot 10 H_2O$ in 400 ml of water is added dropwise. After working up in accordance with Example 1, a magnetic tape is prepared in the same way as described above.

EXAMPLE 3

Before conversion into $\gamma$-$Fe_2O_3$, an $\alpha$-FeOOH prepared in accordance with Example 2 is tempered in air for 1 hour at 675° to 680°C.

After reduction and reoxidation, a magnetic tape is prepared again in accordance with Example 1.

EXAMPLE 4

A solution of 780 g of commercial-grade NaOH and 17.2 g of $Na_3PO_4 \cdot 12 H_2O$ is added at 40°C to 21.9 liters of a solution containing 165 g of $FeSO_4$ per liter and 19 g of $ZnSO_4$ per liter, followed by oxidation with air over a period of 2 hours. Approximately 600 ml of 19% NaOH/h are then added, and $\alpha$-FeOOH formation is completed over a period of 5 hours during which time air is passed through. Working up and tape production were carried out in the same way as described in Example 1.

EXAMPLES 5 and 6 (see Table 2)

EXAMPLE 7 a. Seed formation is carried out in the same way as described in Example 2 until the pH-value has fallen to 3.5. After heating to 80.°C, 188 g of $CoSO_4 \cdot 7 H_2O$ (corresponding to 1.9% by weight of Co, based on the total quantity of $\alpha$-(Fe, Co)OOH formed), are added and precipitation is completed under the conditions described in Example 1. After tempering at 620°C, reduction with moist hydrogen at 420°C and reoxidation into $\gamma$-(Fe, Co)$_2O_3$, a magnetic tape with the following characteristics is prepared in the same way as described in Example 1:

| | |
|---|---|
| $I^H C$ powder | = 499 Oe |
| $I^H C$ tape | = 507 Oe |
| $B_R/B_S$ max. | = 0.83 |
| $B_R/B_S$ tape | = 0.82 | b. Standard γ-(Fe, Co)$_2$O$_3$ magnetic tapes prepared without the simultaneous addition of zinc and phosphate show $B_R/B_S$ values of from 0.75 to 0.79 and a considerable reduction in coercive field strength when the γ-(Fe, Co)$_2$O$_3$ powder is worked into a magnetic tape.

It will be appreciated that the instant specification and examples are set forth by way of illustration and not limitation, and that various modifications and changes may be made without departing from the spirit and scope of the present invention.

tant to an iron (II) salt solution to precipitate iron hydroxide, carbonate or a basic iron salt, followed by oxidation at a pH of about 2 to 8 to form FeOOH seeds, growing said seeds and subsequently dehydrating and reducing, the improvement which comprises carrying out seed formation in the presence of about 0.1 to 4 percent by weight of zinc ions and about 0.1 to 2 percent by weight of phosphate ions, based on the α-FeOOH to be precipitated.

4. The process of claim 3, wherein seed formation is carried out in the presence of about 0.1 to 2 percent by weight of zinc ions and about 0.1 to 1.0 percent by weight of phosphate ions.

5. The process of claim 3, wherein the zinc and phosphate ions are added to at least one of the iron (II) salt solution and the basic precipitant before seed formation.

6. The process of claim 3, wherein the phosphate ions are added together with the basic precipitant to the iron (II) salt solution.

7. The process of claim 3, wherein zinc and phosphate ions are used in about equimolecular quantities.

Table 2

| Example | $I^Hc$ Powder A/cm | Oe | Tape A/cm | Oe | $B_R/B_S$ Max. | Tape | UF$_3$ (dB) | Zn (% by weight) set in | found | P$_2$O$_5$ (% by weight) set in | found |
|---|---|---|---|---|---|---|---|---|---|---|---|
| 1 | 268 | 337 | 251 | 315 | 0.85 | 0.845 | +0.5 | 0.74 | 0.64 | 0.3 | 0.24 |
| 2 | 264 | 331 | 266 | 334 | 0.89 | 0.88 | ±0 | 0.38 | 0.34 | 0.3 | 0.28 |
| 3 | 311 | 390 | 293 | 368 | 0.89 | 0.89 | ±0 | 0.38 | 0.34 | 0.3 | 0.28 |
| 4 | 283 | 355 | 252 | 316 | 0.82 | 0.82 | ±0 | 0.38 | — | 0.15 | — |
| 5 (standard commercial pigment containing phosphate) | 287 | 360 | 250 | 314 | 0.80 | 0.79 | ±0 | — | — | 0.3 | — |
| 6 Zn-containing pigment | 332 | 416 | 298 | 375 | 0.84 | 0.83 | ±0 | 0.74 | — | — | — |
| 7a | 398 | 499 | 404 | 507 | 0.83 | — | 0.38 | 0.33 | 0.3 | 0.27 | |
| 7b | 399 | 500 | 359 | 450 | 0.80 | 0.78 | — | — | — | — | — |

What is claimed is:

1. An acicular, magnetic iron oxide pigment containing about 0.1 to 2 percent by weight of zinc and phosphate ions.

2. An iron oxide pigment as claimed in claim 1 containing about 0.15 to 1.0 percent by weight of zinc ion, about 0.15 to 1.0 percent of phosphate ion and about 1 to 10 percent by weight of at least one of cobalt, nickel and manganese.

3. In the production of an acicular, magnetic iron oxide pigment by adding a basically reacting precipi-